United States Patent [19]

Woychio et al.

[11] 4,326,731
[45] Apr. 27, 1982

[54] FOLDING CART

[76] Inventors: Stephen Woychio, c/o George Spector, 3615 Woolworth Bldg., 233 Broadway; George Spector, 3615 Woolworth Bldg., 233 Broadway, both of New York, N.Y. 10007

[21] Appl. No.: 80,178

[22] Filed: Oct. 1, 1979

[51] Int. Cl.³ ............................................. B62B 3/02
[52] U.S. Cl. ................................. 280/641; 211/198; 280/47.34; 280/639; 312/258; 403/95
[58] Field of Search ................ 280/638, 639, 641, 33, 280/99 H, 42, 35, 39, 47.34, 79.1 R, 79.3, 474, 410, 408, 494; 312/258; 211/195, 198; 403/92, 95

[56] References Cited

U.S. PATENT DOCUMENTS

| | | | |
|---|---|---|---|
| 543,020 | 7/1895 | Holmes | 211/198 |
| 968,958 | 8/1910 | Krichbaum | 403/95 |
| 1,820,466 | 8/1931 | Lieblein | 280/42 |
| 2,583,191 | 1/1952 | Voorhees | 280/494 |
| 2,813,727 | 11/1957 | Whalen | 280/47.34 X |

*Primary Examiner*—Joseph F. Peters, Jr.
*Assistant Examiner*—D. W. Underwood

[57] ABSTRACT

A material transporting cart, including a horizontal platform upwardly pivotable about a transverse hinge across its center, the opposite ends of the platform being pivoted on vertical end frames, the lower ends of the end frames and the upwardly foldable central portion of the platform being mounted upon wheels for travel on a ground, and the platform divided by the hinge into two components additionally including a swivel pin near the hinge so that one component pulls the other when the cart is in use.

2 Claims, 7 Drawing Figures

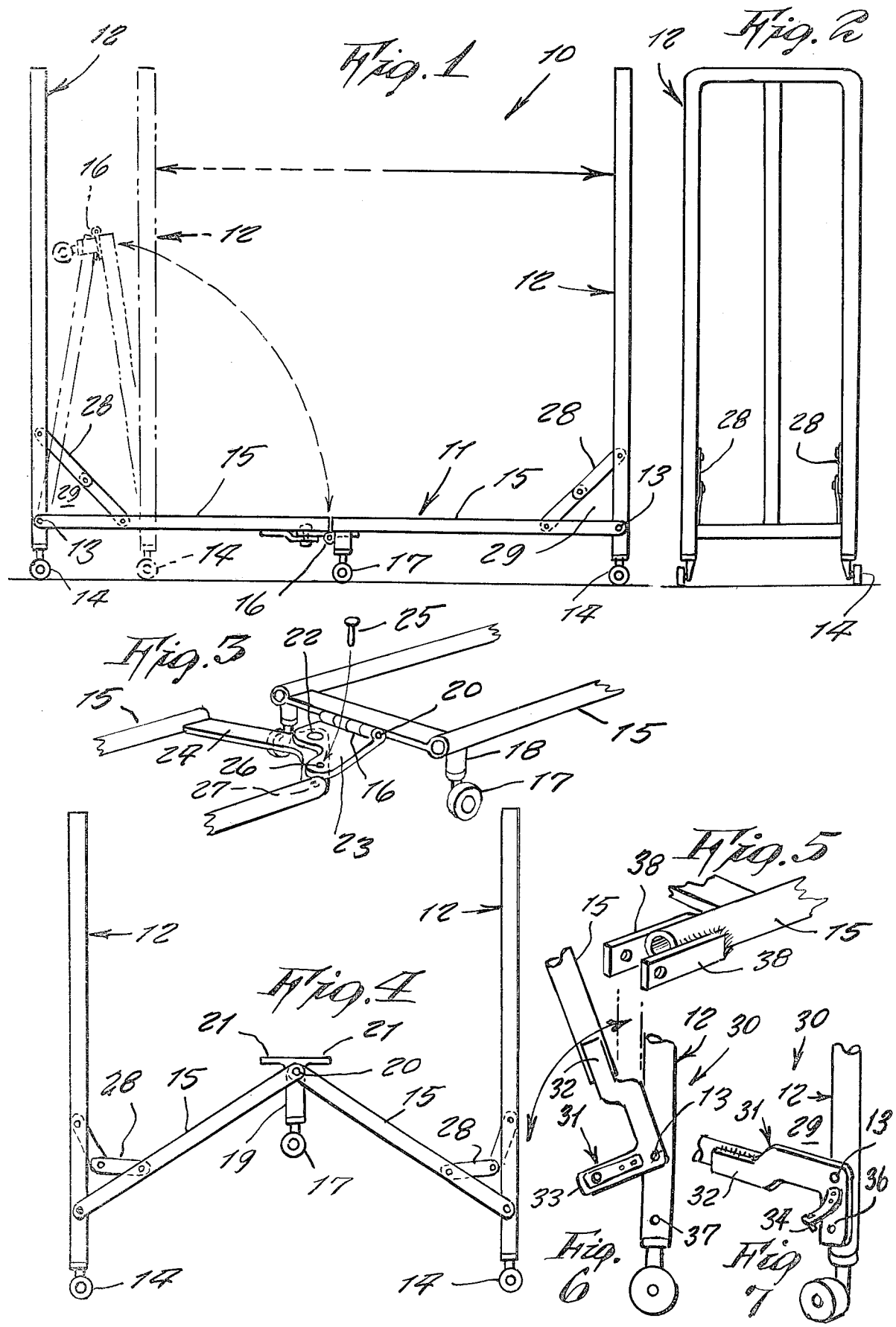

FOLDING CART

This invention relates to material handling carts such as are used for store door vendors, potato chips, cookies, cakes, etc. where the cart must be light weight for easy lifting.

It is well known that hand trucks and fork lift trucks are conventional means employed to move freight about in large storage areas.

It is a principal object of the present invention to provide a material transporting cart that is more efficient than a hand truck as it is less tiring in use and can handle a larger volume of goods.

Another object is to provide a cart which swivels at its center so that it can be moved around sharp corners and worked through narrow zig-zagged paths formed between piles of goods so that it can maneuver just as easily as a hand truck while carrying a larger volume such as an ordinary four wheeled cart but which could not do such maneuvering.

Still another object is to provide a cart that folds up into a collapsed position when not in use so to require less storage space, and which can easily be pushed about such collapsed position so as to squeeze into tight areas.

FIG. 1 is a side view of one design of the invention in which the platform is pivotable directionally at its center so that the cart can travel close around sharp corners or other interferences.

FIG. 2 is an end view thereof.

FIG. 3 is a detail of the platform center pivot, and showing a removable pin which when inserted, locks the platform so it does not pivot at its center as wished.

FIG. 4 is a side view of another design in which the foldable platform does not directionally pivot at its center like the design of FIG. 1.

FIG. 5 is a view of a pivotable end of one of the platform arms.

FIG. 6 is a fragmentary side view of a modified construction thereof which eliminates the need of the foldable braces that hold up the end frames vertically, and shown in folded position.

FIG. 7 is a perspective view of the structure shown in FIG. 6, and illustrating the same when the platform is in a horizontal position.

Referring now to the drawing in greater detail, and more particularly to FIGS. 1 to 5 thereof, the reference numeral 10 represents a folding cart, according to the present invention, wherein there is a horizontal platform 11 and a pair of vertical end frames 12 pivotally attached thereto by means of rivets 13. All these may be made of tubular steel, lightweight channel, angle iron or the like, welded, bolted or riveted into the frame like structures thereof as shown in the drawing.

The lower ends of the end frames are each mounted upon a pair of carter wheels 14.

The platform is comprised of two, same length platform components 15 pivotally connected together by a hinge 16 therebetween so that the cart thus formed by the cart, can be collapsed, as shown by phantom lines in FIG. 1. Another pair of caster wheels 17 attached to one of the components 15 is located near the hinge so as to support the center of the platform upon a floor or ground. The caster wheels 17 may be mounted on posts 18 extending downwardly fixedly from the component, as shown in FIGS. 1 and 3, or the wheels 17 may be mounted on a separate frame 19 pivoted on a hinge pin 20 of the hinge 16, as shown in FIG. 4, so that in a folded position of the cart, the wheels 17 hang downward instead extend sidewardly. Frame 19 is T shaped so that ears 21 thereof rest upon the two components 15 when the platform is horizontal in order that the wheels are held against the ground.

A swivel action between platform components 15 allows one component to tow the other in order to permit the long platform to bend when it goes around sharp corners. This action is accomplished by a swivel pin 22 through a leaf 23 of the hinge and through crosspiece 34 of the other component, as shown in FIG. 5.

The swivel action can be selectively prevented, if so wished, by dropping a lock pin 25 through aligned holes 26 and 27 of the two components.

Folding braces 28 at the corners of the platform serve to hold the end frames vertically upright.

In FIGS. 6 and 7 a modified construction eliminates the above described braces 28 so to not interfere with large boxes fitting into the corners 29 formed between the platform and the end frames. In this design 30, an angular shaped plate 31 includes a leg 32 welded to the end of the platform components, and receives the rivet 13 at its corner, so that the other leg 33 of the plate 31 swings downward alongside a lower portion of end frame 12 when the platform is in horizontal position. A lock pin 34 on a leaf spring 35 mounted on the plate 31 is snapped through hole 36 on the plate 31 and in a hole 37 on the end frame, thus securing the end frame in a vertical position while keeping a corner 29 free for large boxes to fit snug thereinto without any interference. Thus this construction differs from that of FIG. 5 wherein straight plates 38 are used for the construction shown in FIGS. 1 through 4.

What is claimed:

1. A folding cart comprising an assembly having a horizontal platform pivotally connected at a first end to a vertical end frame in combination with a similar assembly having a platform and vertical end frame wherein said assemblies are attached at second ends by a connector including means pivotal about a horizontal axis whereby the second ends may be raised pivotally relative each other and said end frames further including end wheels at the first ends of said platforms and central wheels at the said second ends of said platforms, wherein said connector also includes swivel means providing pivotal motion of one of said assemblies about a vertical axis.

2. A cart as in claim 1 wherein the each said platform is secured to each said end frame by an end member having a pivot pin extending through said member and end frame including a transverse extension having a movable pin attached thereto adapted to be retained in a hole in said end frame spaced from the said pivot pin.

* * * * *